United States Patent [19]
Greene et al.

[11] 3,989,798
[45] Nov. 2, 1976

[54] REGENERATING FLUE GAS DESULFURIZATION CATALYSTS WITH REDUCING GAS

[75] Inventors: David F. Greene, Westfield; Robert J. Lang, Watchung; Albert B. Welty, Jr., Westfield, all of N.J.

[73] Assignee: Exxon Research and Engineering Company, Linden, N.J.

[22] Filed: July 23, 1973

[21] Appl. No.: 381,369

Related U.S. Application Data

[63] Continuation of Ser. No. 800,104, Feb. 18, 1969, abandoned.

[52] U.S. Cl. .............................. 423/244
[51] Int. Cl.² .............. B01J 8/00; C01B 17/00
[58] Field of Search ................... 423/242–244

[56] References Cited
UNITED STATES PATENTS 3,411,865  11/1968  Pijpers .............................. 423/244
3,454,356  7/1969  Raman .............................. 423/244
3,501,897  3/1970  Van Helden et al. ............. 423/244

Primary Examiner—Oscar R. Vertiz
Assistant Examiner—Gregory A. Heller
Attorney, Agent, or Firm—Louis F. Kreek, Jr.; Wayne Hoover

[57] ABSTRACT

Flue gas is desulfurized by absorbing it onto a selective absorbent-catalytic material. The absorbed $SO_2$ is recovered by contacting it in a desorption cycle with a reducing desorption gas. In one embodiment, multiple absorbent beds are employed and alternate absorption-desorption cycles are used in each of the multiple beds with the flue gas and the desorption gas used alternately. The sulfur oxide is recovered in concentrated form in the desorption gas stream and is then utilized as feed in a conventional sulfuric acid plant yielding concentrated sulfuric acid.

5 Claims, 9 Drawing Figures 3,989,798

REGENERATING FLUE GAS DESULFURIZATION CATALYSTS WITH REDUCING GAS

This is a continuation of application Ser. No. 800,104, filed Feb. 18, 1969, and now abandoned.

BACKGROUND OF THE INVENTION

Some high sulfur coals and fuel oils which are burned in the boiler-generator units of electrical power stations and other industrial furnaces are the source of air pollution problems in heavily populated areas. The flue gas from these fuels contains $SO_2$ and $SO_3$ and efforts are being made to develop efficient processes for removing these materials. While the problem is generally greater for electric power plants, it is also a problem for other industries where heat must be generated in a boiler, and ore smelting and the like.

Economic considerations are dominating evaluation of the various candidate processes. Many processes for removing $SO_2$ and $SO_3$ are being developed which are satisfactory from a technical standpoint. (See Arthur M. Squires – "Air Pollution: The Control of $SO_2$ from Power Stacks," Chemical Engineering, Nov. 20, 1967, pp. 133–140; and A. V. Slack, "Air Pollution: The Control of $SO_2$ from Power Stacks. Part III—Process for Recovering $SO_2$, " Chemical Engineering, Dec. 4, 1967, pp. 188–196, and British Pat. No. 1,089,716.) However, no process has been generally accepted for commercial use because of the high investment and operating costs of the known processes. Processes which provide by-product credits are obviously more attractive and one process currently being considered involves oxidizing sulfur dioxide in the flue gas to the trioxide, cooling to condense sulfuric acid formed by reaction of the trioxide with steam and recovering the acid in about 70 to 80% concentration. See Chemical Engineering, June 8, 1964, pp. 92–94. Aside from cost, the chief disadvantages of this process are that the sulfuric acid mist causes corrosion problems and that the demand for 70% sulfuric acid is not as great as the demand for more concentrated sulfuric acid such as 98–100% sulfuric acid. Furthermore, little or no nitric oxide is removed.

SUMMARY OF THE INVENTION

It is the basis of the present invention that economical processes have been discovered wherein $SO_2$ can be removed from flue gas in a manner which excludes mist formation and which provides a product sulfuric acid of a concentration above 95% and which also removes most of the NO.

Generally speaking, the process of the present invention comprises the steps of absorbing sulfur oxide, e.g., $SO_2$ and/or $SO_3$ from the flue gas on a solid, selective dry absorbent-catalyst material at a first locus or in a first cycle, followed by desorption of sulfur oxide in a separate zone or locus or in a separate desorption cycle. Suitable absorbent-catalytic materials include vanadium oxides such as vanadium pentoxide promoted with 10 to 20% potassium oxide or other alkali metal oxide. A gas at a temperature about the same as that utilized for the absorption step is used to desorb the sulfur oxide from the catalyst. In accordance with the present invention this desorption gas is a reducing gas. Such reducing gas may comprise hydrogen, or a gas mixture containing hydrogen and/or carbon monoxide or a hydrocarbon or a mixture of hydrocarbons. As examples, may be mentioned low-molecular hydrocarbons such as methane, ethane, propane, butane and the like or mixtures such as natural gas or petroleum straight run distillates such as a virgin gas oil boiling 425° to 500° F. Hydrogen is generally the desorption gas of preference but, due to its high cost, it is usually desired to utilize gas mixtures containing from 10 to 50 volume percent of hydrogen with the remaining portion of the gas being carbon monoxide and/or hydrocarbon, together with associated diluents such as carbon dioxide, steam and nitrogen. One preferred mixture available in commerce would be producer gas which contains carbon monoxide, hydrogen, methane, carbon dioxide and nitrogen. Another is a mixture made by catalytic steam reforming of natural gas. The resulting desorption stream which is concentrated in $SO_2$ can then be utilized as a feed stream in a sulfuric acid plant of conventional design to produce sulfuric acid of approximately 99% concentration.

Thus, the $SO_2$ conversion technique of the process of the present invention is a cyclic one involving absorption-desorption in a continuous and sequential manner employing an absorption zone and a desorption zone as one preferred embodiment. In an alternative embodiment, the absorbent-catalytic material is present in multiple zones and each zone undergoes a separate absorption and then a distinct desorption cycle in sequential manner. In the former embodiment, the catalyst acts as the carrier means between the zones. The catalyst can be moved from one zone to the other by any suitable means. One cyclic technique involves the raining solids type of reactor in which particulate catalyst falls by gravity down through the reactor and is transported to the desorption zone by entrainment in a carrier gas. Another technique involves the use of a downwardly moving bed of catalyst with the absorber placed over the desorber and with suitable sealing means between the two contacting steps. Still another embodiment is the use of a rotating reactor which provides a continuous, sequential absorption-desorption cycle. In a preferred form of this embodiment, the catalyst is in the form of a honeycomb or continuous cylinders with the axis parallel to the line of flow.

BRIEF DESCRIPTION OF THE DRAWINGS

The preferred embodiments of the present invention will be more fully described below in conjunction with the drawings in which.

DESCRIPTION OF THE PREFERRED EMBODIMENTS

Figure 1:
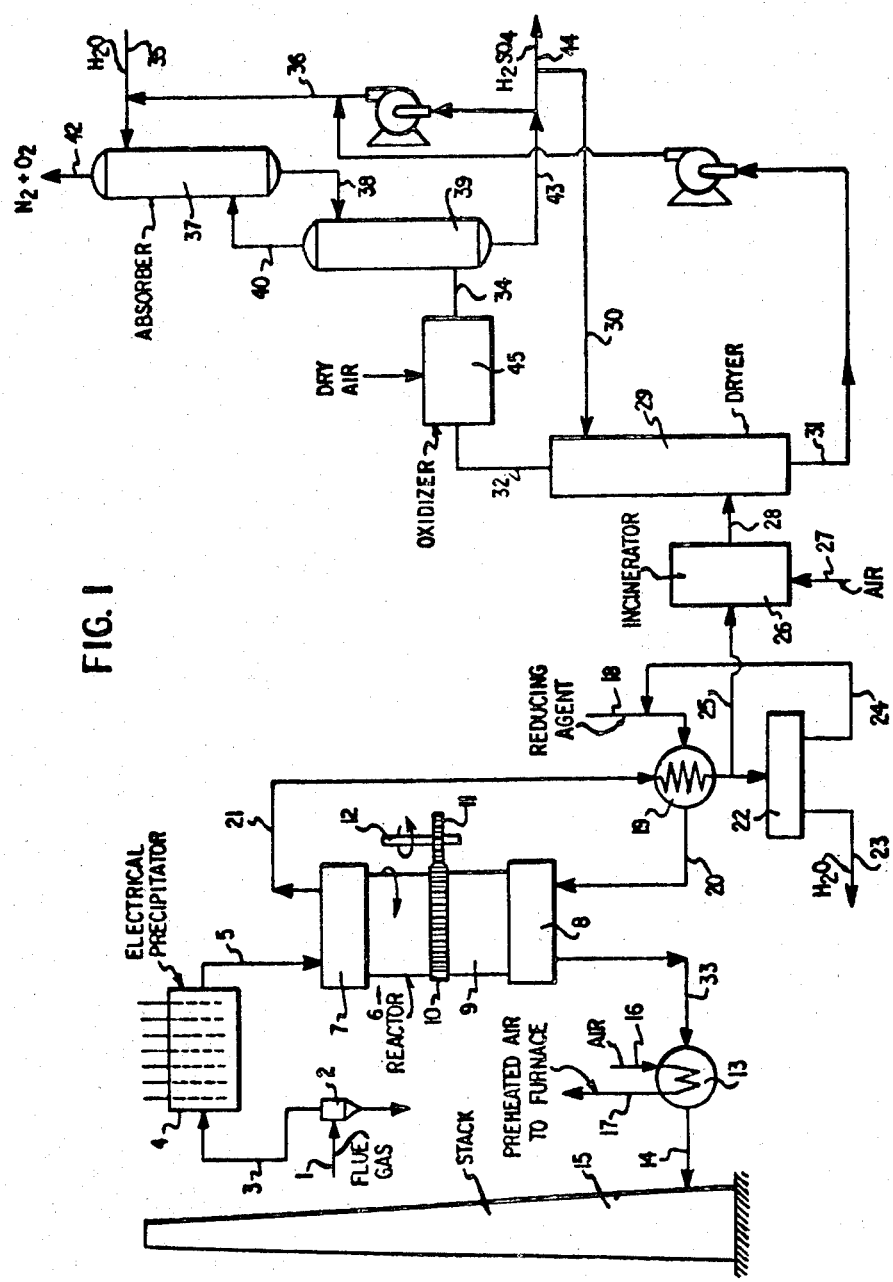
FIG. 1 is a diagrammatic flow sheet of one embodiment of the process.

Referring to FIG. 1, flue gas from a furnace flue is fed by line 1 to a series of cyclones shown generally by reference numeral 2 and thence by line 3 to electrical precipitators 4. A typical flue gas derived from the combustion of coal or fuel oil or mixture of these containing 2 to 6 wt. % sulfur contains about 1000 to 4000 parts per million by volume of $SO_2$, about 5 to 100 parts per million by volume of $SO_3$ and the balance is $N_2$, $O_2$, $CO_2$, $H_2O$, NO, ash and unburned hydrocarbon. The function of the cyclones and electrical precipitators is to remove fly ash and other solids from the flue gas since these materials tend to deactivate the catalyst in continuous operations. The removal of fly ash and other solids is not an essential element of the process and when the catalyst is so placed in the reactor that solids can pass through freely, the cyclones and/or the precipitators can be eliminated.

The solids-free flue gas passes by line 5 to a rotating reactor shown generally by reference numeral 6. The upper end of the reactor 7 and the lower end of the reactor 8 are stationary and the middle portion of the reactor rotates about the vertical axis. The middle portion 9 of the reactor is turned by a drive gear arrangement or by any other suitable means. As shown in the present embodiment a band gear 10 mounted on the reactor shell is driven in a clockwise direction by a drive gear 11. The drive gear is actuated by any suitable type of motor attached to the shaft 12.

The middle portion of the reactor is packed with a suitable metal oxide catalyst, e.g., vanadium oxide. In one embodiment the rotating portion of the reactor is divided into a series of wedge shaped sections of approximately equal volume and cross sectional area. The catalyst can be supported in the sections by any suitable type of screen, grid or pierced plate which permits free flow of the process gases. These details will be discussed more fully in subsequent paragraphs. It is not essential that the reactor be exactly cylindrical or that the catalyst sections be exactly wedge shaped. Any structural arrangement which will permit the catalyst sections to continuously and sequentially register with the fixed inlets and outlets in the desired manner and which forces the gas to travel in a direction parallel to the axis of rotation and prevents the gas from travelling in a direction perpendicular to the axis of rotation is satisfactory. While the reactor has been shown in a vertical position in this embodiment, it should be understood that it may also be operated in the horizontal position or inclined at any desirable angle.

Flue gas containing $SO_2$ passes continuously from line 5 through a wedge shaped opening in the upper end of the reactor and then into each section of catalyst bed as the section rotates into a position opposite the opening. After passing downwardly through the reactor the gas passes into a corresponding wedge shaped opening at the lower end of the reactor and then into line 33. As the gas passes through the middle section of the reactor, $SO_2$ is absorbed by the catalyst. The quantity, size and shape of the catalyst in each section is selected so that the pressure drop is relatively low. The purified flue gas in line 33 is passed through heat exchange 13 and then by line 14 to stack 15. In the present case cold combustion air is passed by line 16 through heat exchanger 13 and then hot air is passed to the utility or industrial furnace (not shown) by line 17. Thus, flue gas entering the process at a temperature in the range of from about 600° to 900° F. contacts the catalyst at essentially the same temperature with a preferred range of 775° to 850° F. and, following heat exchange, passes to the stack at a temperature of 250° to 300° F. The pressure is not critical for the operation of the process and is whatever naturally develops in order for the flue gas to get through the heat exchange system and out of the stack. Usually this will be less than one pound per square inch higher than atmospheric. When the catalyst arrangement is such that an excessive pressure drop may occur, a gas driving means or a suction means can be placed in line 5 or line 33.

In the conversion and desorbing step a reducing agent such as hydrogen, carbon monoxide, a hydrocarbon such as methane or mixtures thereof, or even a light gas oil, is admitted via line 18, through heat exchanger 19 and line 20 to the reactor. Temperature of the reducing gas may be in the range of 500° to 900° F., preferably 800° to 850° F. The reducing gas is oxidized by the sulfated absorbent-catalyst to $H_2O$ and $CO_2$ and $SO_2$ is released. The effluent regeneration gas leaves the reactor via line 21. When a liquid hydrocarbon such as a light gas oil is used as the reducing agent, a portion is preferably passed to separator 22 to remove water which is drawn off through line 23 and then recycled by line 24 to line 18.

The portion of the regeneration gas and $SO_2$ not used for recyle, which, of course, is all of it when recycle is not used, is passed by line 21 through heat exchanger 19 and thence through line 25 to incinerator 26 where any residual hydrogen, carbon monoxide or hydrocarbons are burned with oxygen or air introduced through line 27. The remaining $SO_2$ containing gas is now passed by line 28 to dryer 29 where any water present is removed by absorption in a countercurrent sulfuric acid stream having a concentration of 99.5% introduced through line 30 and removed as less concentrated $H_2SO_4$ through line 31. This effluent is recycled to line 36 where it is mixed with recycled product sulfuric acid. Dry effluent from dryer 29 is removed overhead through line 32 and passed to oxidizer 45 where the $SO_2$ is oxidized to $SO_3$ in the presence of a suitable catalyst such as vanadium oxide promoted with potassium oxide as described in connection with the absorber-reactor 6. The resulting $SO_3$-containing gas mixture is passed by line 34 to the sulfuric acid plant. This unit is conventional and constitutes no part of the invention. In the embodiment shown in the drawing the proper quantity of water is added by line 35 to the $H_2SO_4$ in line 36 diluting the acid to 98.5%. This acid is passed by line 36 to absorber 37 and thence by line 38 to absorber 39. The acid countercurrently contacts the $SO_3$-containing gas mixture introduced through line 34, absorbing the $SO_3$ on contact. The temperature in the absorbers ranges from 175° to 250° F. Pressure is preferably slightly above atmospheric. $SO_3$ not absorbed in absorber 39 passes by line 40 to absorber 37 and gas substantially free of $SO_3$ is vented through the stack to the atmosphere by line 42. Acid of 99.6% concentration is withdrawn through line 43 and a portion recycled through line 36 for dilution as described above. Another portion is passed by line 30 and used as the acid introduced to the top of dryer 29. The remainder is withdrawn through line 44 as product. In locations where the small amount of residual $SO_3$ is troublesome from a pollution point of view, the gas in line 42 can be returned to line 5 instead of to the atmosphere. Thus, the gas from the absorber is vented through the stack after being treated in the reactor. Suitable sulfuric acid feeds to the concentration step are 98.0 to 99.9% acid and acids having a concentration of 98.5 to 99.5% are preferred.

Figure 2:
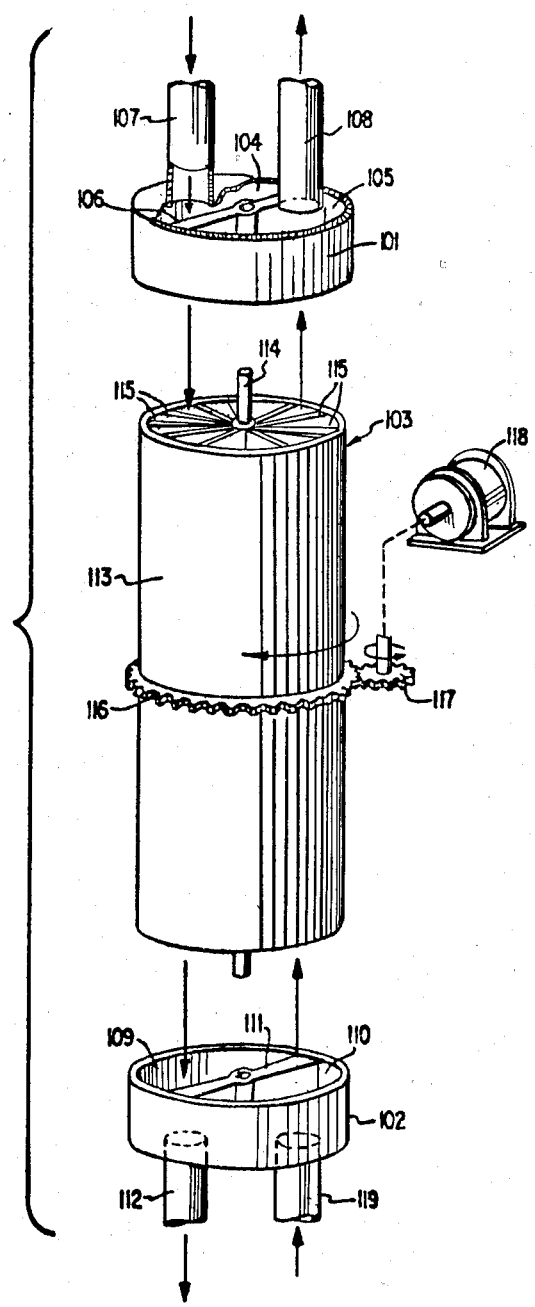
FIG. 2 is a partially exploded view of a rotating reactor.

FIG. 2 discloses a schematic view of the reactor partially broken away. The reactor comprises fixed upper and lower gas chambers 101 and 102 and a rotatable reaction vessel shown generally by reference numeral 103. The upper gas chamber is partitioned into two gas ducts 104 and 105. Although the ducts are shown as having about equal volume, they may be and usually will be different depending on the exact catalyst substance used, the operating temperature chosen or convenient to use and the amount of sulfur dioxide in the flue gas. In the case of a cylindrical reactor, the partition 106 will be in the form of two wedges. The partition blanks off about 5 to 10% of the volume of the gas chamber and provides a seal between the input duct and the output duct. When $SO_2$ is absorbed during downflow through the reactor, duct 104 is the flue gas input duct and pipe 107 is the flue gas supply line. Also, duct 105 is the reducing gas output or recovery duct and pipe 108 is the reducing gas recovery pipe. The lower gas chamber is also partitioned into two gas ducts 109 and 110 by partition 111. When $SO_2$ is absorbed during downflow, duct 109 is the flue gas output or recovery duct and pipe 112 is the recovery pipe for the purified flue gas. Pipe 119 is the reducing gas input pipe.

When the reactor is cylindrical it consists of a shell 113 surrounding a central vertical shaft 114. A series of dividers shown generally by reference numeral 115 are employed to divide the reactor into wedge shaped sections and these are preferably approximately equal in volume. Suitable seals, not shown, provide a seal between the reactor and the upper and lower gas chambers. The pressure on the reducing gas side of the reactor is maintained slightly above that on the flue gas side so that any tendency to leak allows reducing gas to get into the flue gas and not the reverse. It is desirable to keep the moisture in the flue gas out of the reducing gas since moisture interferes with the proper functioning of the acid absorber. The ends of the central shaft of the reactor are fitted into rotating alignment with the gas chambers by suitable bearing means not shown. In the embodiment shown, the reactor shell is encircled by a band gear 116 and the gear is driven in the desired direction by drive gear 117 which is operatively connected to motor 118 by any suitable type of linkage.

The dimensions of the reactor, the gas chambers and the piping are dependent on the gas throughput, the quantity of sulfur oxide in the flue gas, the quantity of catalyst required and other factors.

In operation, flue gas containing $SO_2$ is passed from duct 104 into each of the wedge sections as they pass by the duct. By the same token, desorption gas is passed simultaneously from duct 110 into and through the remaining wedge sections not blanked off by partitions 106 and 111 to desorb the sulfur oxide. This continuous and simultaneous contacting approach permits intimate contacting of very large volumes of gas with a relatively small volume of catalyst.

Figure 3:
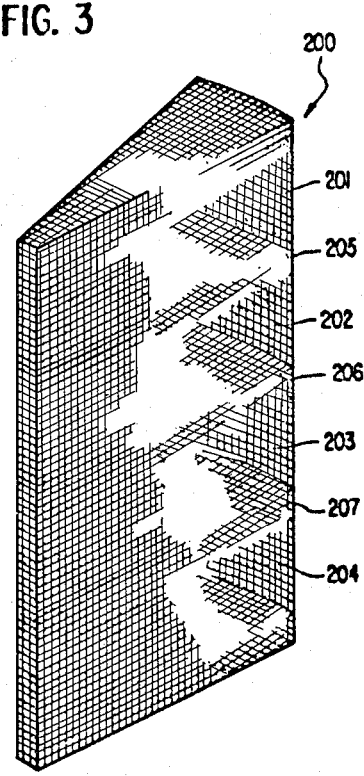
FIGS. 3 to 8 are partial views showing various ways of arranging the catalyst in the sectorial catalyst compartments.

FIG. 3 discloses one type of catalyst arrangement in which a wedge shaped section 200 is made up of a plurality of compartments 201, 202, 203 and 204. These are placed one below the other with void spaces 205, 206 and 207 disposed between the sections. Each wedge shaped section is filled with catalyst, although for illustrative purposes all the catalyst is not shown. The catalyst is held in position by grid plates and metal screens or any other means which will hold the catalyst in place on the top, bottom and sides, yet permit the minimum pressure drop as the gas passes through. This arrangement is very desirable when the flue gas contains ash since the top section 201 can be replaced frequently. This particular section contacts the ash-containing flue gas first and acts as a guard chamber for the sections below.

Figure 4:
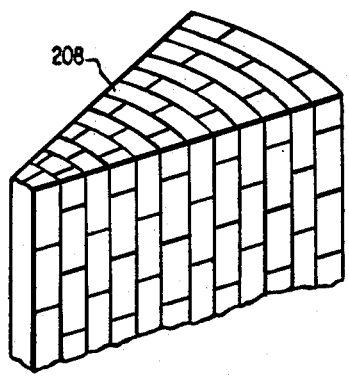
Figure 5:
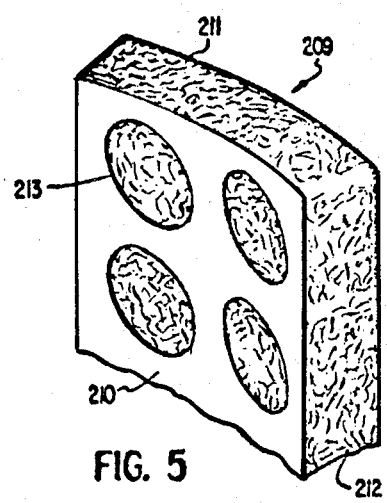

FIG. 4 discloses a portion of a wedge shaped section made up of a series of batts of appropriate size and shape. Reference numeral 208 indicates one of these and FIG. 5 provides more detail. The catalyst is prepared in the form of long fibers and these are packed into a metal frame shown generally by reference numeral 209. The frame consists of a front plate 210 and a back plate, not shown, held in spaced relationship to one another by braces 211 and 212. The top, sides and bottoms of the batt are open and the front and back contain the maximum number of holes 213 possible consistent with the structural rigidity of the batt and the necessity of holding the catalyst fibers in place. The batt can be visualized as similar to an air conditioner screen.

Figure 6:
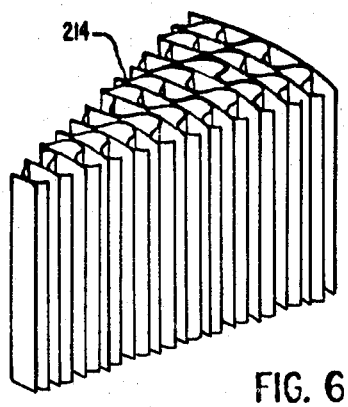
Figure 7:
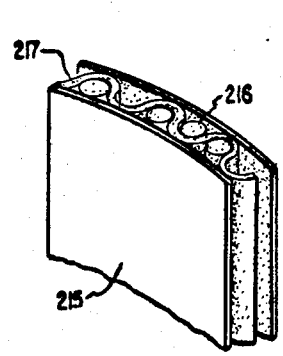

FIGS. 6 and 7 disclose a wedge shaped section shown generally by reference numeral 214 which is made up of a series of front and back sheets 215 and 216 with a corrugated sheet 217 located between them. In this embodiment the catalyst is prepared in the desired form or a catalyst support is prepared in the desired form and soaked with a solution of catalyst. In this embodiment the catalyst sections can be visualized as similar to a series of sheets of corrugated paper.

Figure 8:
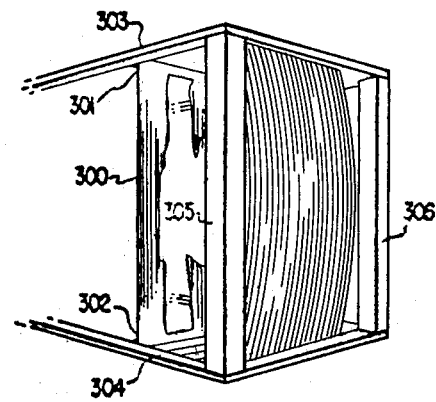

FIG. 8, a partial isometric view, discloses another embodiment of the invention in which the catalyst is in the form of fibers. The vanadium oxide can be a part of the composition or mixture from which the fibers are prepared or the fibers can be used as a support or carrier with the vanadium oxide disposed on the surface of the fibers by soaking the latter in a solution of the catalyst and drying. A particularly suitable fiber material is fiber glass and the vanadium oxide can be deposited on the fiber glass by known means. The dimensions of the fibers can be selected on the basis of engineering requirements. Reference numeral 300 refers to a bundle of fibers held in vertical alignment at the top end 301 and the bottom end 302. A plurality of bundles of fibers are placed in shaped relationship and supported by a frame, having a top section 303, a bottom section 304 and vertical supports 305 and 306. The frame can be wedge shaped or it can be of any other suitable shape and size suitable for placement in the reactor. The fibers are attached at the ends without any tension so that they may move back and forth in the horizontal plane, thus promoting good contact with the gas without pressure drop. Ash and other solids will pass through the catalyst sections without depositing on the catalyst.

The catalyst and support structure will occupy from 10 to 90% of the total volume of the rotating reactor, preferably from 40 to 80%.

A typical particulate $SO_2$ $SO_3$ conversion catalyst consists of 5 to 10 wt. % vanadium oxide plus 8 to 15% potassium oxide on a suitable carrier such as inorganic oxides, e.g., silica, silica-alumina, alumina, mullite and zircon-mullite.

Other alkali metals such as sodium rubidium, cesium, etc., may be substituted for potassium, but the latter appears to be the best material from the standpoint of compromise between activity and cost.

Without adsorbent. to be bound by any theory, it is postulated that the reactions are of the following type when vanadium oxide promoted with $K_2O$ is the absorbent.

Adsorption
$$V_2O_3 \cdot K_2SO_4 + SO_2 + O_2 \rightarrow VOSO_4 + K_2S_2O_7$$

Desorption
$$VOSO_4 \cdot K_2S_2O_7 + H_2(\text{or CO}) \rightarrow V_2O_3 \cdot K_2SO_4 + SO_2 + H_2O(\text{or } CO_2)$$

Figure 9:
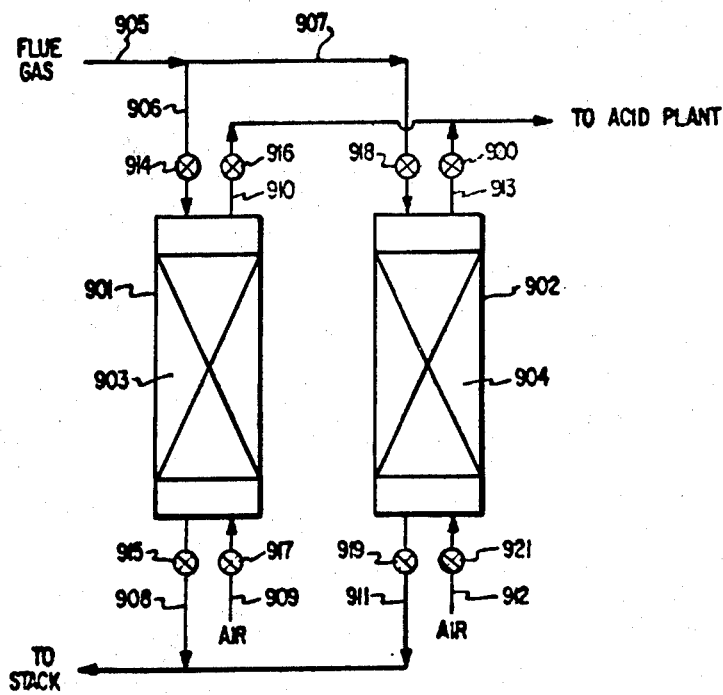
FIG. 9 is a schematic view of a dual fixed bed system wherein flue gas is treated in a first zone while the sulfur oxide saturated bed is desorbed by treatment with a desorption gas in the second zone, respective cycles are then switched at predetermined intervals when desired absorption levels of sulfur oxide on the beds are reached.

FIG. 9 represents a diagrammatic view of a multiple bed embodiment of the present invention in which sequential absorption-desorption cycles are utilized in each bed. In this particular embodiment, two beds joined in parallel to the process are shown, it being understood that a larger number of beds may be employed successfully in the practice of the present invention.

The first absorbent-reactor vessel 901 contains a suspended bed of absorbent-catalytic material such as vanadium pentoxide loaded with potassium oxide (903 in the figure). Flue gas enters the system by means of line 905 and passes into vessel 901 through the bottom portion of the tee joint serving to split the flue gas stream through control valve 914 and line 906. The $SO_2$ content of the flue gas is absorbed onto the absorbent-catalytic solid contained in bed 903. The purified flue gas passes out of vessel 901 through control valve 915 and line 908 and is discharged from the system, after appropriate heat exchange, to the stack.

After the absorbent bed in vessel 901 has reached the desired saturation level of sulfur oxide, which preferably will be before breakout of $SO_2$ into the purified flue gas stream, valves 914 and 915 are closed and valves 916 and 917 are open. This starts the desorption cycle wherein heated desorption gas, i.e., hydrogen or the like, at a temperature in the range from about 500° to 900° F. enters through line 909 and passes through bed 903. The reaction of the reducing gas results in the formation and release of $SO_2$ from the bed. The reducing gas needed will be substantially less than the volume of flue gas which originally was used to contact the bed during the absorption cycle. This results in a concentrated stream of $SO_2$ in the reducing gas stream passing out of vessel 901 through line 910. This concentrated $SO_2$ stream provides a highly satisfactory feed stream for a conventional sulfuric acid plant as described in connection with FIG. 1. The $SO_2$ concentration in the desorption stream will generally be in the range between about 10 to 70% by volume, generally in the range of 20 to 50% by volume.

While vessel 901 is on the desorption cycle, valve 918 is open, thereby allowing additional flue gas to pass through line 907 into vessel 902. In this vessel $SO_2$ is removed from the flue gas, as before, by contacting with catalyst-absorbent material in bed 904. The purified flue gas flows through line 911 by control valve 919 out to the stack. As in the previous case, when the absorption level in vessel 902 has reached desired levels, valves 918 and 919 are closed and valves 920 and 921 are open to inaugurate the desorption cycle. Heated reducing gas enters through line 912 and causes desorption of $SO_2$ yielding a concentrated stream of $SO_2$ in reducing gas which leaves vessel 902 through control valve 920 and line 913 to the acid plant.

While the above embodiment demonstrates a two vessel system, it is evident that additional vessels may be utilized either in series or parallel with the first two. The length of the absorption and desorption cycles will depend upon the relative efficiency of the absorbent-catalyst material to pick up $SO_2$ from the flue gas and to desorb the $SO_2$ in the reducing gas stream. These cycles may vary in length from equal length for the absorption and desorption cycles to up to 80% or more on the absorption cycle and 20% or less on the desorption cycle. It is evident that when unequal cycle lengths are used there will be periods when both vessels will be operating to absorb flue gas. The timing for the respective cycles should be adjusted so that both beds are not on the desorption cycle at the same time. By staggering the initial absorption cycle for each of the two vessels, it is possible to get a continuous process for the removal of $SO_2$ from the flue gas.

EXAMPLE 1

The following example is typical of the operations of the process of the present invention utilizing a rotating reactor and a reducing gas desorption cycle:

Flue gas containing 2,700 ppm $SO_2$ and 20 ppm $SO_3$ and some oxygen enters the rotating reactor at 800° F. and 770 mm. Hg pressure. The reactor is charged with 160,000 pounds of catalyst-absorbent in the form of a low pressure drop honeycomb having an adsorbent layer of sulfated $K_2O$—$V_2O_5$ catalyst (about 10% $K_2O$ and 10% $V_2O_5$ by weight) on adsorbent silica, supported on a calcined ceramic core. A reducing gas containing 37% $H_2$, 5% CO and the rest $CO_2$ and steam is fed continuously to the reducing gas section at a rate of 1260 standard CF/sec. and 800° F. 82% of the cross-sectional area is devoted to flue gas flow, 9% to reducing gas flow, and 4½% each to steam purges on either side of the reducing gas flow. The flue gas actual velocity is 29 feet/sec., and that of the reducing gas 3.2 feet/sec. The flue gas leaves the reactor with only 50 ppm $SO_2$ and 5 ppm $SO_3$. The reducing gas leaving the reactor contains 21% $SO_2$, 66% $H_2O$, 11% $CO_2$, 1% $H_2$, and 1% CO. 25% air is added and the $H_2$ and CO consumed by combustion in an incinerator vessel. The gas is cooled to 100° F., condensed water is separated and the wet gas is passed through an acid tower at 100° F. to remove the remaining water. The dry gas is heated to 800° F. and processed in an $SO_2$ oxidation plant to produce 275 short tons per day of concentrated $H_2SO_4$.

What is claimed is:

1. A process for the removal of $SO_2$ from a flue gas stream containing such flue gas and the production of a concentrated stream of $SO_2$, said process comprising the steps of passing the flue gas at a temperature in the range of about 600° to 900° F. into contact with an absorbent-catalyst material comprising vanadium oxide supported on an inorganic oxide carrier whereby $SO_2$ is absorbed from the flue gas and a stream of flue gas relatively free of $SO_2$ is obtained and then in a separate cycle, contacting the absorbent-catalyst material containing absorbed $SO_2$ with a reducing desorption agent at a temperature in the range of about 800° to 900° F. whereby $SO_2$ is desorbed from the absorbent-catalyst into the desorption gas stream.

2. The process of claim 1 wherein said absorbent-catalyst material contains an alkali metal oxide promoter.

3. The process of claim 1 in which the reducing agent is hydrogen.

4. The process of claim 1 in which the reducing agent is a mixture of carbon monoxide and hydrogen.

5. A process according to claim 1 in which said absorbent-catalyst material is contacted with said reducing desorption agent at a temperature in the range of about 800° to about 800° F.

* * * * *